United States Patent
Tani

(10) Patent No.: US 12,549,672 B2
(45) Date of Patent: Feb. 10, 2026

(54) INSPECTION APPARATUS IN IMAGE PROCESSING SYSTEM THAT NOTIFIES OF CHANGE IN REGISTRATION STATUS OF CORRECT ANSWER IMAGE, AND CONTROL METHOD AND PROGRAM PRODUCT THEREFOR

(71) Applicant: CANON KABUSHIKI KAISHA, Tokyo (JP)

(72) Inventor: Yoshiaki Tani, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 18/307,941

(22) Filed: Apr. 27, 2023

(65) Prior Publication Data
US 2023/0386019 A1 Nov. 30, 2023

(30) Foreign Application Priority Data
May 24, 2022 (JP) ................................ 2022-084708

(51) Int. Cl.
*H04N 1/00* (2006.01)

(52) U.S. Cl.
CPC ..... *H04N 1/00015* (2013.01); *H04N 1/00034* (2013.01); *H04N 1/00045* (2013.01); *H04N 1/00074* (2013.01); *H04N 1/0009* (2013.01)

(58) Field of Classification Search
CPC ........... H04N 1/00015; H04N 1/00029; H04N 1/00031; H04N 1/00034; H04N 1/00045; H04N 1/00071–0009; H04N 1/2392; H04N 1/6033; H04N 1/6047; G06F 3/1256; G06K 15/027; G06T 7/0002; G06T 7/0004; G06T 7/001; G06T 2207/30144; G06T 2207/30168
See application file for complete search history.

(56) References Cited

U.S. PATENT DOCUMENTS

| | | | |
|---|---|---|---|
| 11,277,530 B2 * | 3/2022 | Kurohata | H04N 1/00076 |
| 11,422,754 B2 | 8/2022 | Goda et al. | |
| 11,556,285 B2 * | 1/2023 | Kawamura | G06F 3/1208 |
| 11,722,605 B2 * | 8/2023 | Kimura | H04N 1/00015 |
| | | | 358/1.14 |
| 11,755,260 B2 * | 9/2023 | Kashiwagi | G06F 3/1208 |
| | | | 358/1.13 |
| 11,816,374 B2 * | 11/2023 | Kobashi | G06F 3/1206 |
| 11,829,669 B2 * | 11/2023 | Tanaka | G06F 3/1259 |
| 11,838,455 B2 * | 12/2023 | Ichimi | H04N 1/00082 |
| 11,947,853 B2 * | 4/2024 | Mutsuno | H04N 1/00058 |

(Continued)

FOREIGN PATENT DOCUMENTS

JP 2021049744 A 4/2021

*Primary Examiner* — Scott A Rogers
(74) *Attorney, Agent, or Firm* — ROSSI, KIMMS & McDOWELL LLP

(57) ABSTRACT

An inspection apparatus capable of improving workability in checking a registration status of a correct answer image. The inspection apparatus includes a registration unit that registers a correct answer image, an inspection unit that compares an image formed on a sheet by a printing unit with the correct answer image registered by the registration unit to inspect the sheet, and a notification unit that notifies the printing unit of information indicating a registration status of the correct answer image in a case where there is a change in the registration status.

17 Claims, 14 Drawing Sheets

(56) References Cited

U.S. PATENT DOCUMENTS

| | | | |
|---|---|---|---|
| 2021/0096789 A1* | 4/2021 | Goda | H04N 1/32128 |
| 2021/0398262 A1* | 12/2021 | Iwano | G06T 7/001 |
| 2023/0084850 A1* | 3/2023 | Ichimi | G06F 3/1273 |
| | | | 358/1.15 |
| 2024/0037730 A1* | 2/2024 | Kasahara | G06T 7/001 |

* cited by examiner

FIG. 6

FIG. 10
Inspection result
| Date and time | 3/6 10:10 |
| Job name | Bill |
| Number of inspected sheets | 1000 sheets/1000 sheets |
| Number of OK sheets | 986 sheets |
| Number of NG sheets | 14 sheets |
Previous job   1/9 job   Next job
OK

FIG. 12

| Job name | Registration status of correct answer image | Number of pages |
|---|---|---|
| Test1.pdf | Correct answer image is unregistered | 5 |
| Test2.pdf | Correct answer image has been registered | 10 |
| Job1.pdf | Correct answer image is registering | 8 |
| Job2.pdf | Inspection condition has been set | 20 |
| Job3.pdf | Correct answer image is unregistered | 10 |
| ... | ... | ... |

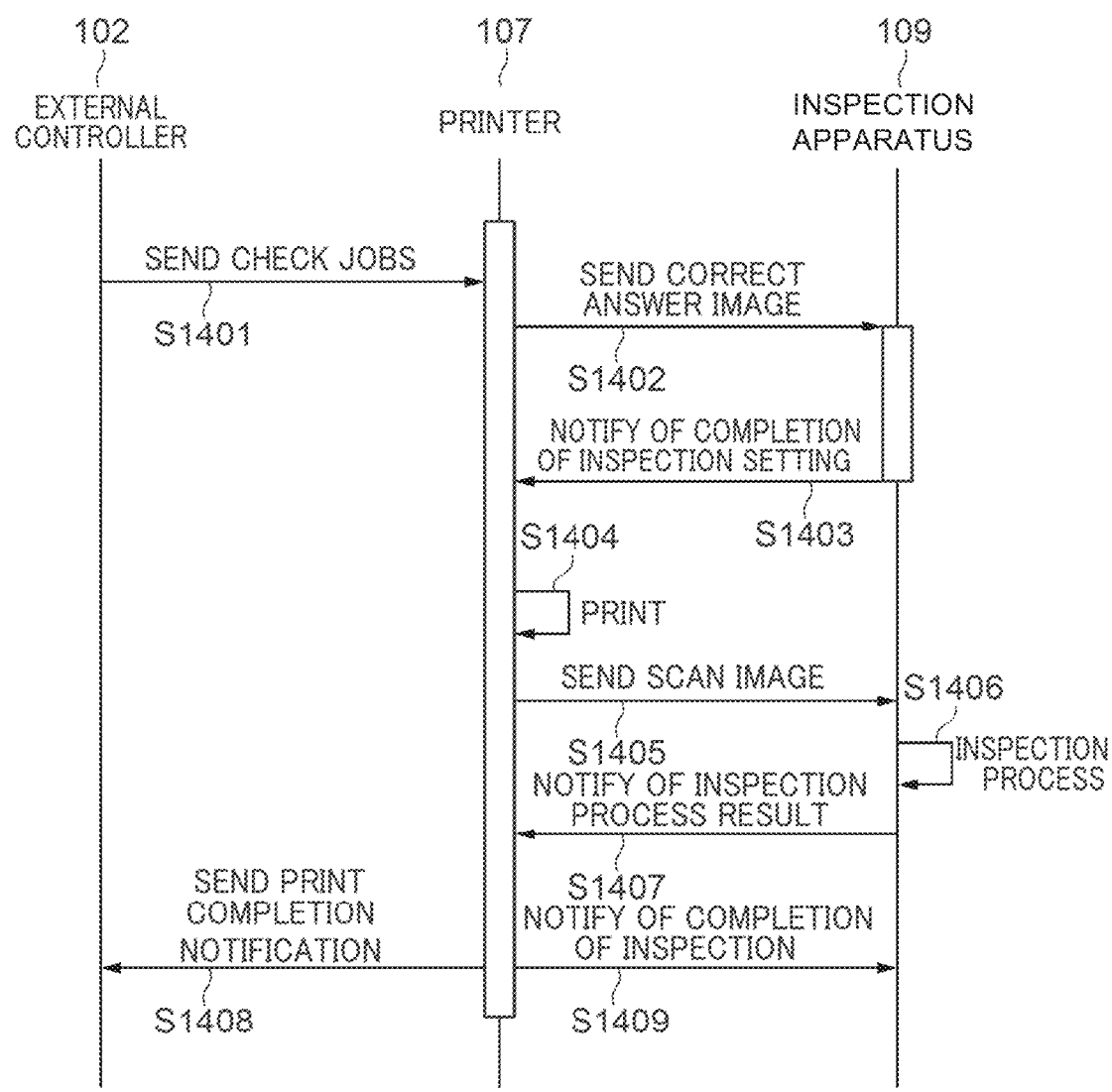

INSPECTION APPARATUS IN IMAGE PROCESSING SYSTEM THAT NOTIFIES OF CHANGE IN REGISTRATION STATUS OF CORRECT ANSWER IMAGE, AND CONTROL METHOD AND PROGRAM PRODUCT THEREFOR

BACKGROUND OF THE INVENTION

Field of the Invention

The present invention relates to an inspection apparatus, a control method therefor, and a storage medium storing a control program therefor, and an image processing system.

Description of the Related Art

In recent years, there has been known an image processing system (a printing system) that inspects a sheet (paper) printed by a printing apparatus during conveyance. In a sheet inspection process, first, the system causes an inspection apparatus to read an image of a reference sheet, and registers the read image as a correct answer image. Then, the system analyzes an image of a sheet that is an output of an executed print job and compares it with the correct answer image to determine whether the sheet is normal. By the inspection, it is possible to detect missing of a bar code or a ruled line, missing of an image, printing stain, missing of a page, color shift, and the like For inspection, in general, a printed image used for inspection is read by the inspection apparatus, and the read image is registered as a correct answer image in the inspection apparatus. At this time, an operator (a worker) needs to visually check whether the read image is appropriate as a correct answer image. When the number of pages of the correct answer images is large, workload for check increases and burden increases. Accordingly, there has been proposed a system in which a specific mark is attached at the time of registration of the correct answer image to reduce working time of the operator and reduce working errors (Japanese Laid-Open Patent Publication (Kokai) No. 2021-49744 (JP 2021-49744A)).

However, the operator needs to confirm the image displayed on the inspection apparatus in order to check a registration status of a correct answer image in performing inspection. Therefore, the efficiency of the checking operation is not high, and there is room for improvement.

SUMMARY OF THE INVENTION

The present invention provides an inspection apparatus that is capable of improving workability in checking the registration status of the correct answer image.

Accordingly, an aspect of the present invention provides an inspection apparatus including a registration unit configured to register a correct answer image, an inspection unit configured to compare an image formed on a sheet by a printing unit with the correct answer image registered by the registration unit to inspect the sheet, and a notification unit configured to notify the printing unit of information indicating a registration status of the correct answer image in a case where there is a change in the registration status.

According to the present invention, it is possible to improve workability in checking the registration status of the correct answer image.

Further features of the present invention will become apparent from the following description of exemplary embodiments with reference to the attached drawings.

BRIEF DESCRIPTION OF THE DRAWINGS

FIG. 6 is a view showing an example of a correct answer image registration screen displayed on the display unit of the inspection apparatus.

FIG. 10 is a view showing an example of a result confirmation screen displayed on the display unit of the inspection apparatus.

FIG. 12 is a view showing an example of a registration status screen.

FIG. 14 is a flowchart showing a sequential flow of a correct answer image registration process and an inspection process of a variation example.

DESCRIPTION OF THE EMBODIMENTS

Figure 1:
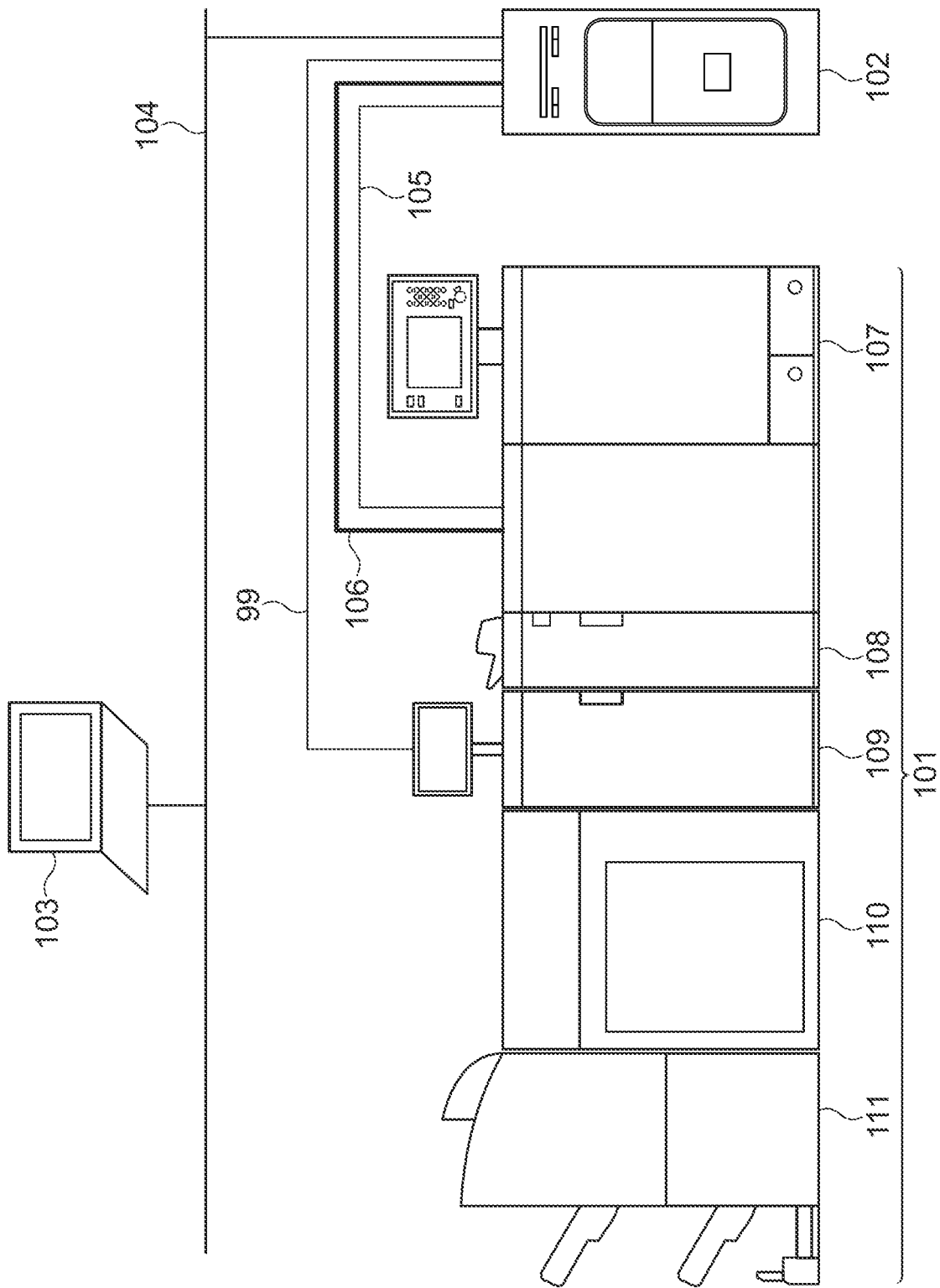
FIG. 1 is a general view showing a hardware configuration of an image processing system.

Hereafter, embodiments according to the present invention will be described in detail by referring to the drawings. The following embodiment does not limit the claimed invention and not all combinations of features described in the embodiment are indispensable to the present invention. An external controller in this embodiment may also be referred to as an image processing controller, a digital front end, a print server, a DFE, or the like. An image forming apparatus may also be referred to as a multi-function peripheral or an MFP.

FIG. 1 is a general view showing a hardware configuration of an image processing system including an inspection apparatus according to the embodiment of the present invention.

This image processing system includes the image forming apparatus 101 and the external controller 102 as an information processing apparatus. The image forming apparatus 101 and the external controller 102 are communicably connected via an internal LAN 105 and a video cable 106. The external controller 102 is communicably connected to a PC 103 via an external LAN 104. The PC 103 can issue a print instruction to the external controller 102.

A printer driver capable of converting print data into a print description language that can be processed by the external controller 102 is installed in the PC 103. A user who performs printing can issue the print instruction from various applications via the printer driver. The printer driver transmits the print data to the external controller 102 in response to the print instruction from the user. The external controller 102 receives the print instruction from the PC 103, performs data-analysis and a rasterization process, and issues the print instruction by inputting the print data to the image forming apparatus 101. The external controller 102 inputs the print data to the image forming apparatus 101 through the internal LAN 105 and inputs the rasterized image data to the image forming apparatus 101 through the video cable 106. The internal LAN 105 and a video I/F 220 (FIG. 2) constitute a sending means for transmitting an image in a print job to the printer 107.

Next, the image forming apparatus 101 will be described. The image forming apparatus 101 includes a plurality of apparatuses having different functions, and is configured to enable a complex print process, such as bookbinding.

The printer 107 forms an image using toner on a sheet (paper) conveyed from a sheet feeder disposed in a lower part of the printer 107. Although paper is used as an example of a sheet in the description, any print medium other than paper may be used.

The configuration and operation principle of the printer 107 are as follows. The printer 107 irradiates a photosensitive drum with a scanning light beam like a laser beam that is modulated according to image data and is reflected by a polygon mirror. An electrostatic latent image formed on the photosensitive drum with the laser beam is developed by toner, and a toner image is transferred to a sheet pasted on a transfer drum. A full color image is formed on a sheet by sequentially executing a series of image forming processes with toners of yellow (Y), magenta (M), cyan (C), and black (K). The sheet on the transfer drum on which the full color image is formed is conveyed to a fixing unit. The fixing unit includes a roller, a belt, and the like, includes a heat source such as a halogen heater in the roller, and melts the toner on the sheet to which the toner image is transferred by heat and pressure to fix the toner on the sheet.

An inserter 108 is an apparatus for inserting an insertion sheet. The inserter 108 can insert a sheet in an arbitrary position to a sheet group printed with the printer 107 and conveyed.

The inspection apparatus 109 reads an image of a conveyed sheet (a printed matter) and compares the read image with a pre-registered correct answer image to determine whether the printed image is normal. The printed matter determined whether it is normal is classified into, for example, a normal printed matter or an abnormal printed matter in which an error has occurred and is discharged.

A large-capacity stacker 110 is an apparatus that can stack mass sheets. The finisher 111 is an apparatus that applies finishing processes to a conveyed sheet. The finisher 111 can perform the finishing processes, such as a stapling process, a punching process, and a saddle stitching process, in accordance with settings, and discharges a processed product to a discharge tray.

Although the image processing system described in FIG. 1 is configured that the external controller 102 is connected to the image forming apparatus 101, the embodiment is not limited to this configuration. That is, the image forming apparatus 101 may be connected to the external LAN 104, and print data that can be processed by the image forming apparatus 101 may be transmitted from the PC 103. In this case, the data-analysis and the rasterization process are performed in the image forming apparatus 101, and the print process is executed. Alternatively, the image forming apparatus 101 may have the function of the external controller 102. A communication line 99 will be described later.

Figure 2:
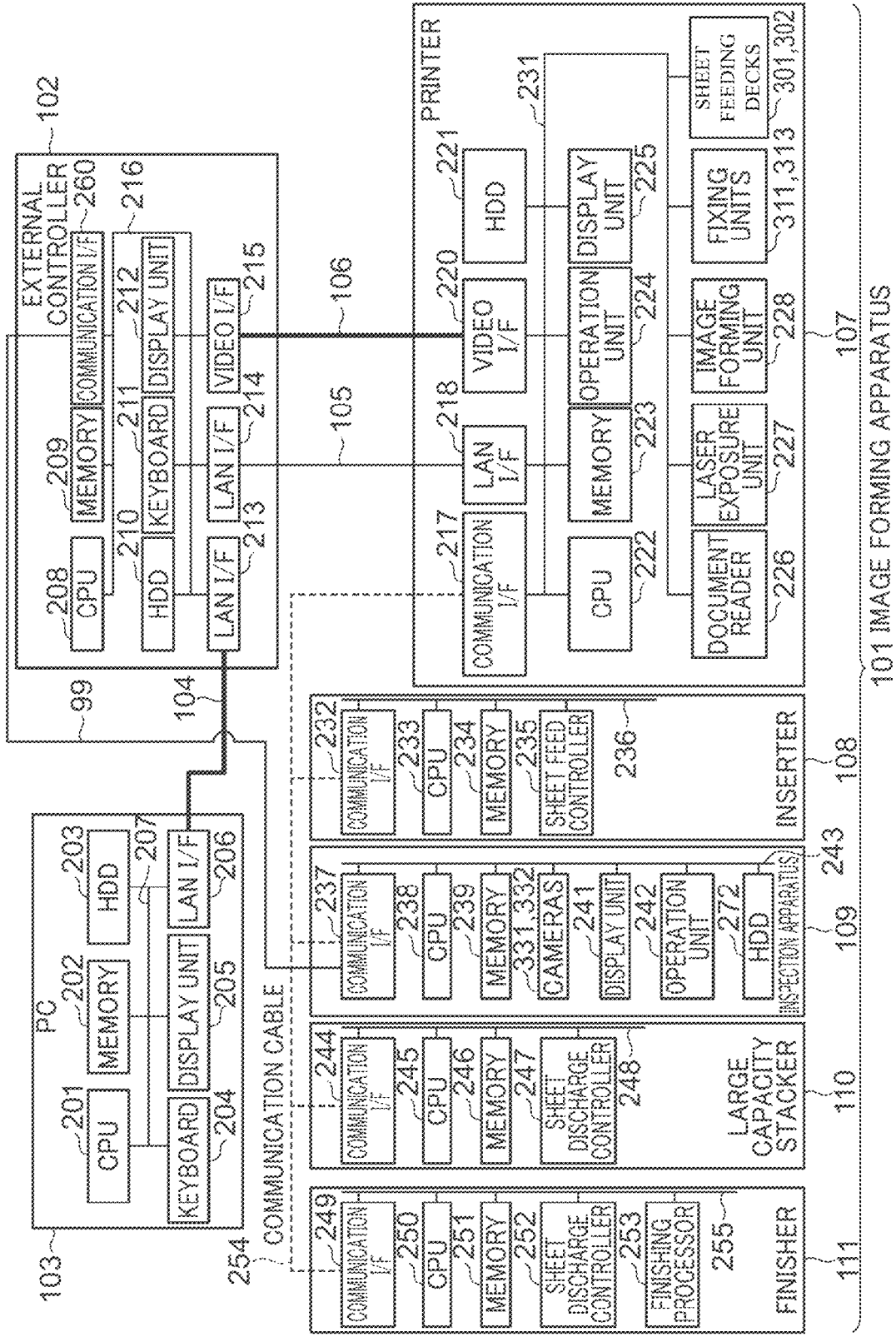
FIG. 2 is a block diagram showing a configuration of the image processing system of FIG. 1.

FIG. 2 is a block diagram showing system configurations of the image forming apparatus 101, external controller 102, and PC 103.

First, the configuration of the printer 107 of the image forming apparatus 101 will be described. The printer 107 of the image forming apparatus 101 includes a communication I/F 217, a LAN I/F 218, the video I/F 220, an HDD 221, a CPU 222, a memory 223, an operation unit 224, and a display 225. Further, the printer 107 includes a document reader 226, a laser exposure unit 227, an image forming unit 228, first and second fixing units 311 and 313, and first and second sheet feeding decks 301 and 302. These components are connected via a system bus 231.

The communication I/F 217 is connected to the inserter 108, the inspection apparatus 109, the large capacity stacker 110, and the finisher 111 via a communication cable 254 to communicate for controlling the respective apparatuses.

The LAN I/F 218 is connected to the external controller 102 via the internal LAN 105 for communicating print data. The video I/F 220 is connected to the external controller 102 via the video cable 106 for communicating rasterized image data.

The HDD 221 is a storage unit that stores programs and data. The CPU 222 comprehensively performs image processing control and printing control according to the programs stored in the HDD 221. The memory 223 memorizes programs and image data that are needed when the CPU 222 performs various processes, and functions as a work area.

The operation unit 224 accepts input of various settings and instructions for operations from a user. The display unit 225 displays setting information about the image processing, the processing status of the print job, etc. The document reader 226 performs processing for reading a document when using the copy function or the scan function. The document reader 226 reads document data by capturing an image with a CCD camera while illuminating a sheet placed by a user with an exposure lamp.

The laser exposure unit 227 performs primary charge, laser exposure for irradiating a photosensitive drum with a laser beam, etc. in order to transfer a toner image. The laser exposure unit 227 first performs the primary charge that electrifies a photosensitive drum surface to uniform negative potential. Next, a laser beam from a laser driver is deflected by the polygon mirror so as to illuminate the photosensitive drum. Thereby, the minus electric charge of an irradiated portion is neutralized and an electrostatic latent image is formed. The image forming unit 228 consists of a development unit, a transfer unit, a toner supply unit, etc., and transfers the toner on the photosensitive drum to a sheet.

The development unit sticks the toner negatively electrified to the electrostatic latent image on the photosensitive drum surface from a development cylinder to visualize the image. The transfer unit performs primary transfer that applies positive potential to a primary transfer roller to transfer the toner on the photosensitive drum surface to a transfer belt and performs secondary transfer that applies positive potential to a secondary transfer outer roller to transfer the toner on the transfer belt to the sheet. Each of the first and second fixing units 311 and 313 melts and fixes the toner on the sheet by heat and pressure, and includes a heating roller having a built-in heater and a pressure roller. Each of the first and second sheet feeding decks 301 and 302 feeds a sheet, and controls a sheet feeding operation and a sheet conveying operation by rollers and various sensors.

The configuration of the inserter 108 of the image forming apparatus 101 will now be described. The inserter 108 includes a communication I/F 232, a CPU 233, a memory 234, and a sheet feed controller 235. These components are connected via a system bus 236. The communication I/F 232 is connected to the printer 107 via the communication cable 254 and communication necessary for control is performed. The CPU 233 performs various kinds of control required for feeding a sheet according to a control program stored in the memory 234. The memory 234 is a storage unit that stores the control program. The sheet feed controller 235 controls feeding and conveyance of sheets conveyed from the sheet feeding unit of the inserter 108 and the printer 107 while controlling rollers and sensors based on instructions from the CPU 233.

The configuration of the inspection apparatus 109 of the image forming apparatus 101 will now be described. The inspection apparatus 109 includes a communication I/F 237, CPU 238, a memory 239, cameras (image capturing units) 331 and 332, a display unit 241, an operation unit 242, and an HDD 272. These components are connected via a system bus 243. The communication I/F 237 is connected to the printer 107 via the communication cable 254 and communication necessary for control is performed. Further, the communication I/F 237 includes an interface for communicating with a communication I/F 260 in the external controller 102 through the communication line 99 and can also communicate with the external controller 102. The communication line 99 may be, for example, a wireless communication standard like a wireless LAN. Any communication standard may be used between the inspection apparatus 109 and the external controller 102.

The correct answer image used for inspection is also received from the printer 107 via the communication cable 254 and the communication I/F 237 and is stored in the HDD 272. The CPU 238 performs various kinds of control necessary for inspection according to the control program stored in the memory 239. The memory 239 is a storage unit that stores the control program.

Each of the cameras 331 and 332 captures an image of a conveyed sheet based on instructions from the CPU 238. The CPU 238 compares the image captured by each of the cameras 331 and 332 with the correct answer image stored in the HDD 272 to determine whether the printed image is normal. An inspection result, a setting screen, etc. are displayed on the display unit 241. The operation unit 242 is operated by the user, and receives an instruction to change the setting of the inspection apparatus 109 and an instruction to register the correct answer image. The HDD 272 stores the correct answer image. If the HDD 272 is not provided, the HDD 221 of the printer 107 may store the correct answer image. In such a case, the correct answer image is read from the HDD 221 to the memory 239 in performing the process that determines whether the printed image is normal.

The configuration of the large capacity stacker 110 of the image forming apparatus 101 will now be described. The large capacity stacker 110 includes a communication I/F 244, a CPU 245, a memory 246, and a sheet discharge controller 247. These components are connected via a system bus 248. The communication I/F 244 is connected to the printer 107 via the communication cable 254, and communication necessary for control is performed. The CPU 245 performs various kinds of control necessary for sheet discharge according to the control program stored in the memory 246. The memory 246 is a storage unit that stores the control program. The sheet discharge controller 247 controls to convey the conveyed sheet to a stack tray, an escape tray, or the following finisher 111 according to an instruction from the CPU 245.

The configuration of the finisher 111 of the image forming apparatus 101 will now be described. The finisher 111 includes a communication I/F 249, a CPU 250, a memory 251, a sheet discharge controller 252, and a finishing processor 253. These components are connected via a system bus 255. The communication I/F 249 is connected to the printer 107 via the communication cable 254, and communication necessary for control is performed. The CPU 250 performs various kinds of control necessary for finishing and sheet discharge in accordance with a control program stored in the memory 251. The memory 251 is the storage device that stores the control program. The sheet discharge controller 252 controls conveyance and discharge of a sheet based on an instruction from the CPU 250. The finishing processor 253 controls the finishing processes, such as the stapling process, punching process, and saddle stitching process, based on an instruction from the CPU 250.

The configuration of the external controller 102 will now be described. The external controller 102 includes a CPU 208, a memory 209, an HDD 210, a keyboard 211, a display unit 212, a LAN I/F 213, a LAN I/F 214, a video I/F 215, and a communication I/F 260. The respective components are connected via a system bus 216. The CPU 208 comprehensively executes processes, such as reception of print data from the PC 103, an RIP process, and transmission of print data to the image forming apparatus 101, on the basis of the programs and data that are stored in the HDD 210.

The memory 209 memorizes programs and data that are needed when the CPU 208 performs various processes, and functions as a work area. The HDD 210 stores programs and data that are required for operations of a print process etc. The keyboard 211 is a device for inputting an operation instruction of the external controller 102. Information about the executing application of the external controller 102 is displayed on the display unit 212 as a still image or a moving image.

The LAN I/F 213 is connected to the PC 103 via an external LAN 104 and communicates a print instruction etc. The LAN IF 214 is connected to the image forming apparatus 101 via an internal LAN 105 and communicates print data as a print instruction. The video I/F 215 is connected to the image forming apparatus 101 via the video cable 106 and communicates rasterized image data etc. The communication I/F 260 can communicate with the inspection apparatus 109 through the communication line 99.

The configuration of the PC 103 will now be described. The PC 103 includes a CPU 201, a memory 202, an HDD 203, a keyboard 204, a display unit 205, and a LAN I/F 206. These components are connected via a system bus 207. The CPU 201 generates print data and issues a print instruction according to a document processing program etc. that are stored in the HDD 203.

The CPU 201 comprehensively controls the units connected to the system bus 207. The memory 202 memorizes programs and data that are needed when the CPU 201 performs various processes, and functions as a work area. The HDD 203 stores programs and data that are required for operations of a print process etc. The keyboard 204 is a device for inputting an operation instruction of the PC 103. Information about the executing application of the PC 103 is displayed on the display unit 205 as a still image or a moving image. The LAN I/F 206 is connected to the external LAN 104 and communicates a print instruction.

In the above description, although the external controller 102 and the image forming apparatus 101 are connected via the internal LAN 105 and the video cable 106, they may be connected via only the video cable 106 as long as data transmission and reception necessary for printing can be performed. Each of the memories 202, 209, 223, 234, 239, 246, and 251 may be a storage unit that can store data and programs. Each of them may be replaced by, for example, a volatile RAM, a nonvolatile ROM, a built-in HDD, an external HDD, a USB memory, or the like.

Figure 3:
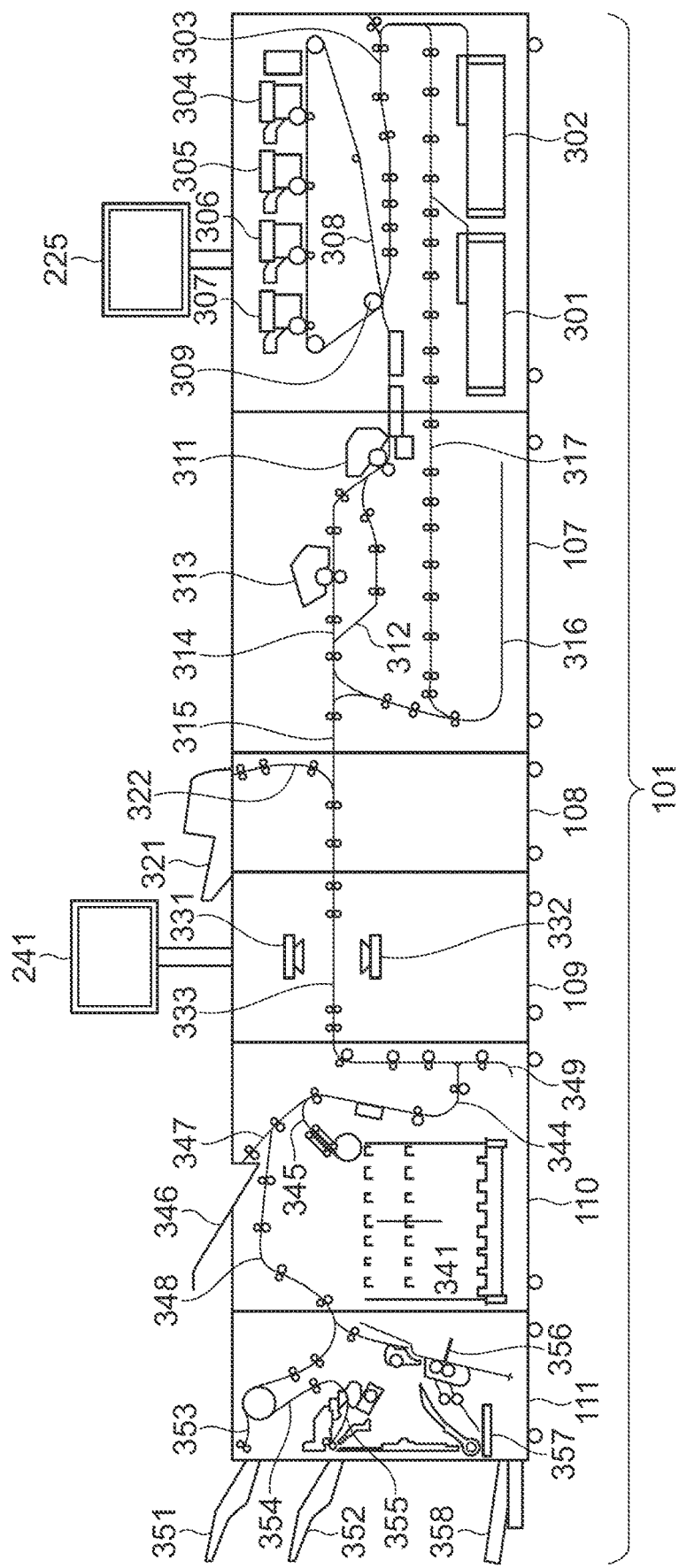
FIG. 3 is a schematic cross-sectional view showing an image forming apparatus in FIG. 1.

FIG. 3 is a schematic cross-sectional view of an image forming apparatus 101. The printer 107 forms an image to be printed on a sheet. The sheet feeding decks 301 and 302 can store various types of sheets. The user can set information (sheet size and sheet type) of sheets stored in each sheet feeding deck from the operation unit 224 (FIG. 2) of the printer 107.

Each of the sheet feed decks can separate an uppermost sheet of stored sheets and convey the separated sheet to the sheet conveyance path 303. Development stations 304, 305, 306, and 307 respectively form toner images using color toners of Y, M, C, and K in order to form a color image. The toner images formed here are primarily transferred to an intermediate transfer belt 308 in an overlapped state. The intermediate transfer belt 308 rotates clockwise in FIG. 3, and the color toner image is transferred onto the sheet conveyed from a sheet conveyance path 303 at a secondary transfer position 309.

The display unit 225 displays information about a printing state and settings of the image forming apparatus 101. The first fixing unit 311 fixes a toner image to a sheet. The first fixing unit 311 includes a pressure roller and a heating roller, and fixes the toner image to the sheet by melting and pressing the toner when the sheet passes between the rollers. The sheet that passes through the first fixing unit 311 is conveyed to a sheet conveyance path 315 through a sheet conveyance path 312.

Some kinds of sheets need further melting and pressuring. Such a sheet is conveyed to the second fixing unit 313 through an upper sheet conveyance path after passing through the first fixing unit 311. The sheet to which the additional melting and pressuring are applied in the second fixing unit 313 is conveyed to the sheet conveyance path 315 through a sheet conveyance path 314. When an image forming mode is a double side mode, the sheet is conveyed to a sheet inversion path 316 and is inverted. After the inversion, the sheet is conveyed to a double-side conveyance path 317, and an image of the second side is transferred to the sheet at the secondary transfer position 309.

The inserter 108 inserts an insertion sheet. The inserter 108 includes an inserter tray 321, and joins a sheet fed to the inserter tray 321 to the conveyance path through a sheet conveyance path 322. Thereby, the inserter 108 can insert a sheet in an arbitrary position of a series of sheet group conveyed from the printer 107 and can convey the sheet group to the following device.

A sheet that passes through the inserter 108 is conveyed to the inspection apparatus 109. The cameras 331 and 332 are arranged so as to face each other in the inspection apparatus 109. The camera 331 reads the upper surface of the sheet, and the camera 332 reads the lower surface of the sheet. The inspection apparatus 109 reads the images of the sheet with the cameras 331 and 332 at a timing when the sheet conveyed to a sheet conveyance path 333 reaches a predetermined position, and determines whether the images are normal. A result of the inspection performed by the inspection apparatus 109 is displayed on the display unit 241.

The large capacity stacker 110 is capable of stacking mass sheets. The large capacity stacker 110 includes a stack tray 341 as a tray for stacking sheets determined as normal sheets (normal printed matters) by the inspection apparatus 109. The sheet having passed through the inspection apparatus 109 is input to the large capacity stacker 110 through a sheet conveyance path 344. The sheet Is stacked on the stack tray 341 from the sheet conveyance path 344 through a sheet conveyance path 345.

Additionally, the large capacity stacker 110 has an escape tray 346 as a discharge tray. The escape tray 346 is a discharge tray used to stack discharged sheets determined as abnormal sheets (abnormal printed matters in which errors have occurred) by the inspection apparatus 109. When a sheet is output to the escape tray 346, the sheet is conveyed from the sheet conveyance path 344 to the escape tray 346 through a sheet conveyance path 347.

When a sheet is conveyed to the finisher 111 of the latter part of the large capacity stacker 110, the sheet is conveyed through a sheet conveyance path 348. An inversion section 349 inverts a sheet. The inversion section 349 is used when a sheet is stacked on the stack tray 341. In a case where the sheets will be stacked on the stack tray 341 so that an orientation of input sheets will become identical to an orientation of output sheets, the sheets are inverted by the inversion section 349. In a case where the sheet is conveyed to the escape tray 346 or the subsequent finisher 111, the sheet is discharged as-is without being flipped in stacking, and thus the inverting operation by the inversion section 349 is not performed.

The finisher 111 is an apparatus that applies a finishing process to a conveyed sheet according to a user specified function. Specifically, the finisher 111 can perform the finishing processes, such as the stapling process (binding at one position or two positions), the punching process (two holes or three holes), and the saddle stitch bookbinding process. The finisher 111 includes discharge trays 351 and 352. The sheet is output to the discharge tray 351 through a sheet conveyance path 353. However, the finishing process like the stapling process cannot be performed in the sheet conveyance path 353.

When the finishing process like the stapling process is performed, a processing unit 355 applies the finishing process designated by the user to the sheet conveyed through a sheet conveyance path 354, and the sheet is output to the discharge tray 352. The discharge trays 351 and 352 can be raised and lowered independently. Sheets subjected to the finishing process by the processing unit 355 can be stacked on the discharge tray 351 by lowering the discharge tray 351. When the saddle stitch bookbinding process is designated, the center of the sheet is stapled by a saddle stitch processing unit 356. After that, the sheet is folded in half and is output to a saddle binding tray 358 through a sheet conveyance path 357. The saddle binding tray 358 has a belt conveyor configuration, and a saddle-stitched booklet bundle stacked on the saddle binding tray 358 is conveyed leftward.

FIG. 4 through FIG. 10 are views showing examples of UI screens displayed on the display unit 241 of the inspection apparatus 109. These UI screens are displayed based on instructions from the CPU 238 of the inspection apparatus 109.

Figure 4:
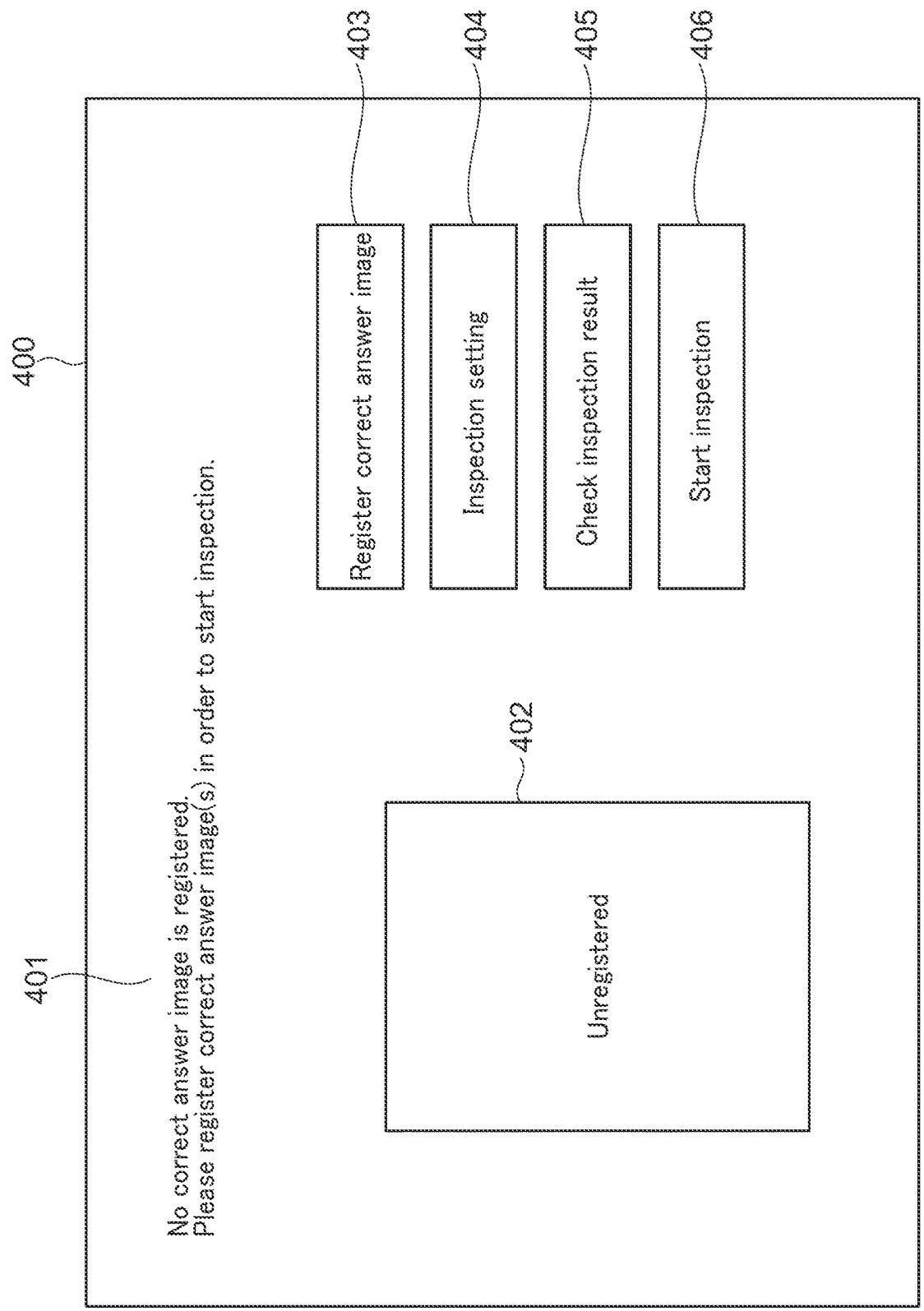
FIG. 4 is a view showing an example of an inspection menu screen displayed on a display unit of an inspection apparatus in FIG. 1.

FIG. 4 is a view showing an example of an inspection menu screen displayed on the display unit 241 in activating the inspection apparatus 109.

In the inspection menu screen 400 shown in FIG. 4, a message indicating that no correct answer image is registered and that registration of a correct answer image(s) is required prior to start of the inspection process is displayed in a message field 401 at upper left. If the correct answer image has been registered at the time of activation, a message indicating that the inspection process can be started is displayed. An image display area 402 in which a correct answer image is displayed is provided below the message field 401. In the example shown in FIG. 4, since no correct answer image is registered, a character string "Unregistered" is displayed.

Four buttons 403, 404, 405, and 406 are lined up on the right side in the inspection menu screen 400. The button 403 is used for calling a UI screen for registering a correct answer image. A correct answer image (also referred to as a reference image) is an image used as a reference in determining whether there is a defect in an inspection image. In this embodiment, the image obtained based on a RIP-processed data is used as a correct answer image. The button 404 is used for calling a UI screen for setting conditions of the inspection. A user sets inspection items and inspection accuracy in accordance with an inspection purpose.

The inspection items include deviation of a print position, a color tone of an image, density of an image, a streak, thin printing, print omission, etc. The inspection accuracy is an index for defining degree of difference of an inspection image that is determined as a defect from a correct answer image, and is defined by a numerical value within 1%, for example. The button 405 is used for calling a UI screen (an inspection result confirmation screen) for confirming the inspection result. The user can confirm the past inspection contents and the inspection results by watching the inspection result confirmation screen. The button 406 is used for instructing start of the inspection. When the pressing of the button 406 is detected, the inspection apparatus 109 starts the inspection of the sequentially conveyed print processed sheets.

It should be noted that the configuration of the inspection menu screen 400 is an example, and it may be configured to display information other than the above, for example, information related to inspection settings such as a partition sheet setting. Next, the UI screens displayed in pressing the buttons 403, 404, and 405 and operations thereof will be described.

Figure 5:
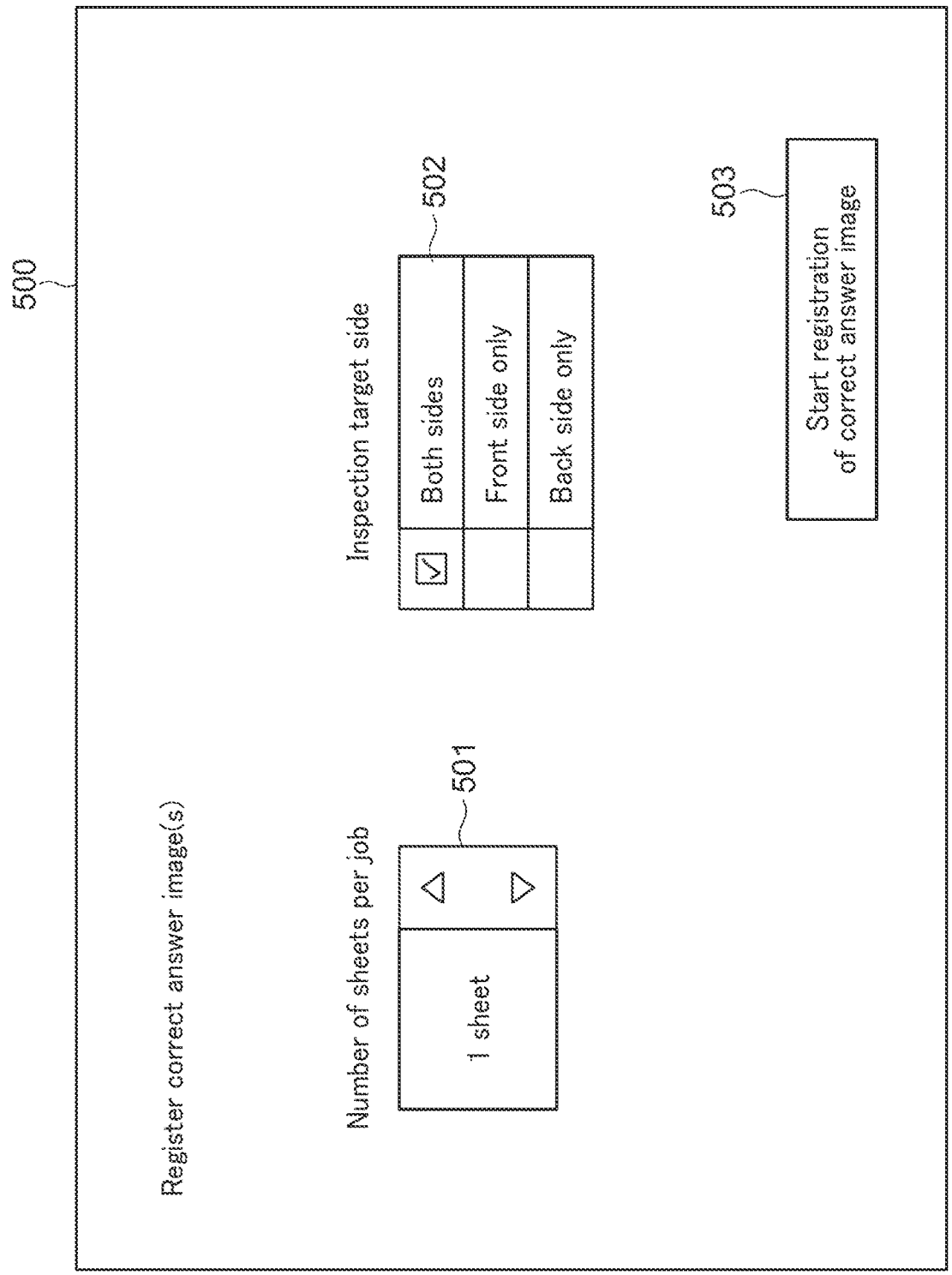
FIG. 5 is a view showing an example of an image registration screen displayed on the display unit of the inspection apparatus.

FIG. 5 is a view showing an example of an image registration screen for registering a correct answer image.

Jobs in this embodiment include a normal job and check jobs. The normal job controls the printer 107 for printing. The check jobs include a correct answer image registration job and an inspection job. The correct answer image registration job registers a correct answer image to the inspection apparatus 109. The inspection job is a print job with inspection (executes inspection) and includes a main print job.

When the user presses the button 403 on the above-mentioned inspection menu screen 400 (FIG. 4), the image registration screen 500 shown in FIG. 5 is displayed on the display unit 241. There are two setting areas 501 and 502 and a button 503 on the image registration screen 500. The number of sheets per one copy of the inspection job is set in the setting area 501. The user can designate the desired number of sheets by operating spin buttons in the settings area 501. In this case, when two or more sheets are designated per one copy, that is, when a printed matter in which one copy includes a plurality of sheets is inspected, a correct answer image can be registered for each sheet.

An inspection target side of a sheet is set in the setting area 502. The inspection target side can be set to both sides of sheet, to a front side only, or a back side only. Even when an image is printed on only one side, the inspection condition may be set to perform inspection to both sides in order to inspect that no dust adheres to a non-printing side. The button 503 is used for starting a process of reading a RIP-processed image of the inspection job and of registering it as a correct answer image. After setting the two settings areas 501 and 502, the user presses the button 503. Then, reception of the RIP-processed image of the inspection job starts, and the screen is changed to a screen indicating that a correct answer image is being registered (hereinafter referred to as a "correct answer image registering screen") as shown in FIG. 6.

Figure 6:
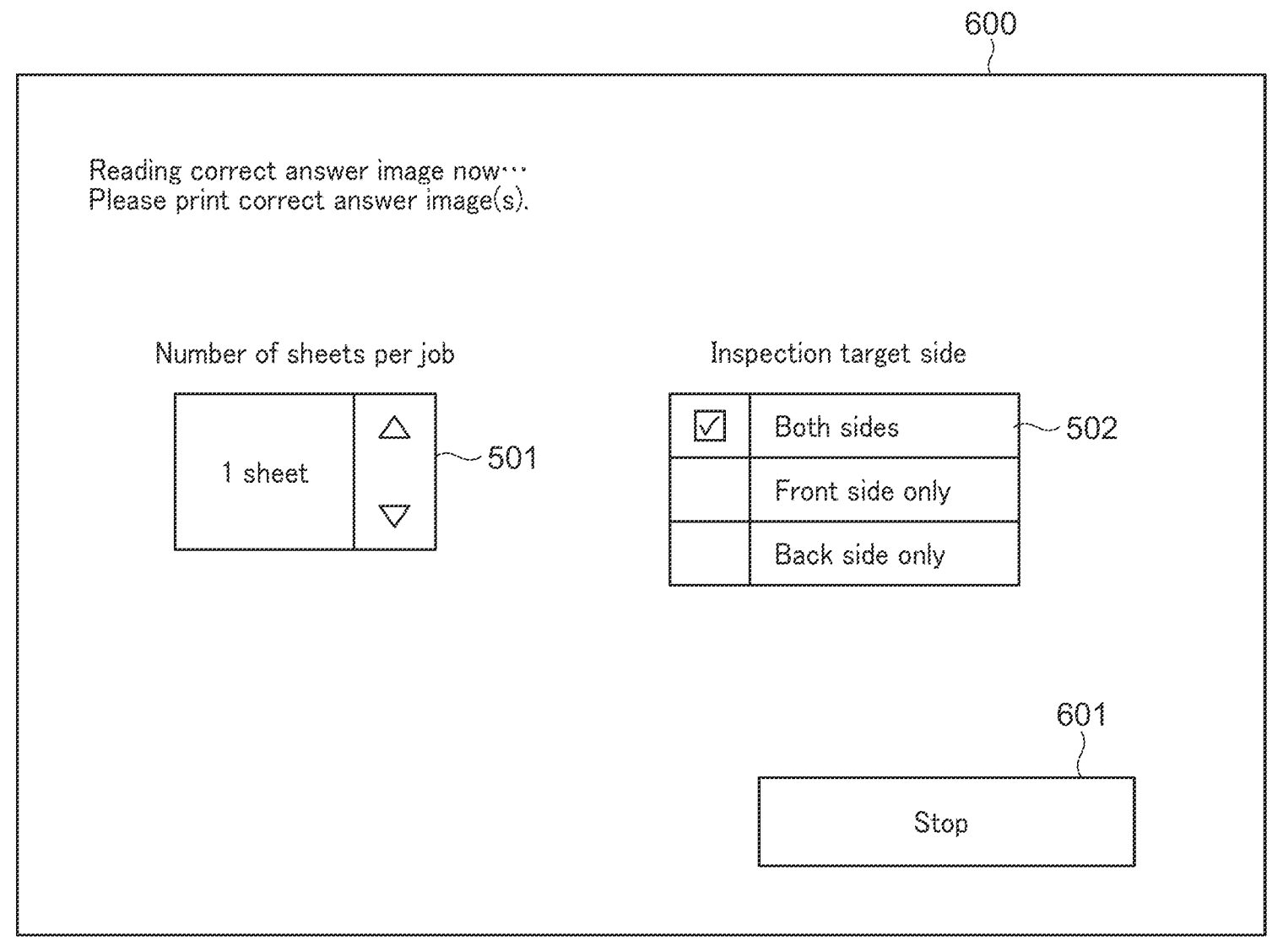

The setting areas 501 and 502 that are displayed on the image registration screen 500 and a registration stop button 601 are displayed on the correct answer image registering screen 600 shown in FIG. 6. When the user presses the registration stop button 601, the reception of the RIP-processed image of the inspection job is stopped. When the reception of the RIP-processed image of the inspection job is finished, the screen is changed to a UI screen (hereinafter referred to as a "registration process screen") as shown in FIG. 7 that prompts registration of the correct answer image and setting of related items.

Figure 7:
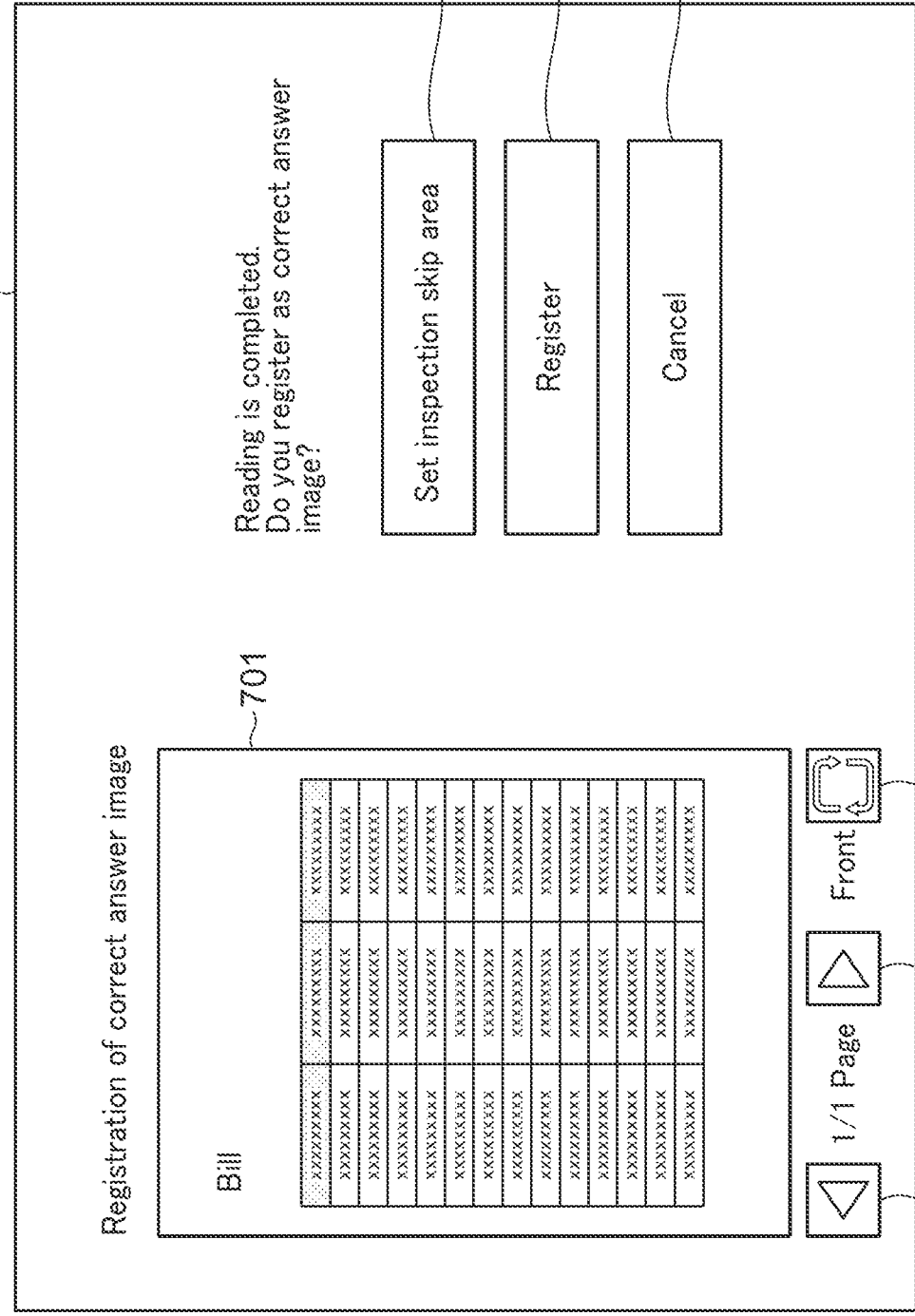
FIG. 7 is a view showing an example of a registration process screen displayed on the display unit of the inspection apparatus.

There is an image display area 701 in which the received image is displayed on the left side in the registration process screen 700 shown in FIG. 7. There are buttons 702 for switching a sheet to be displayed when one copy includes a plurality of sheets and a button 703 for switching a front side and a back side to be displayed below the image display area 701. When the number of sheets per copy set on the image registration screen 500 is one sheet, the button 702 may not be displayed.

On the right side in the registration process screen 700, three buttons 704, 705, and 706 are lined up. The button 704 is used for setting an inspection skip area in the correct answer image that is not compared with the inspection image. The inspection skip area is set when the inspection target area is limited. For example, Variable Data Printing (VDP) that changes a print content in a specific area in a sheet for each copy is given as a use case. In addition, use cases include a case of printing while attaching a different ID to each copy, a case of printing while changing only an address section or a name section for each copy, etc. When the button 704 is pressed, the registration process screen 700 is changed to an inspection skip area setting UI screen (hereinafter referred to as an "area setting screen") as shown in FIG. 8.

Figure 8:
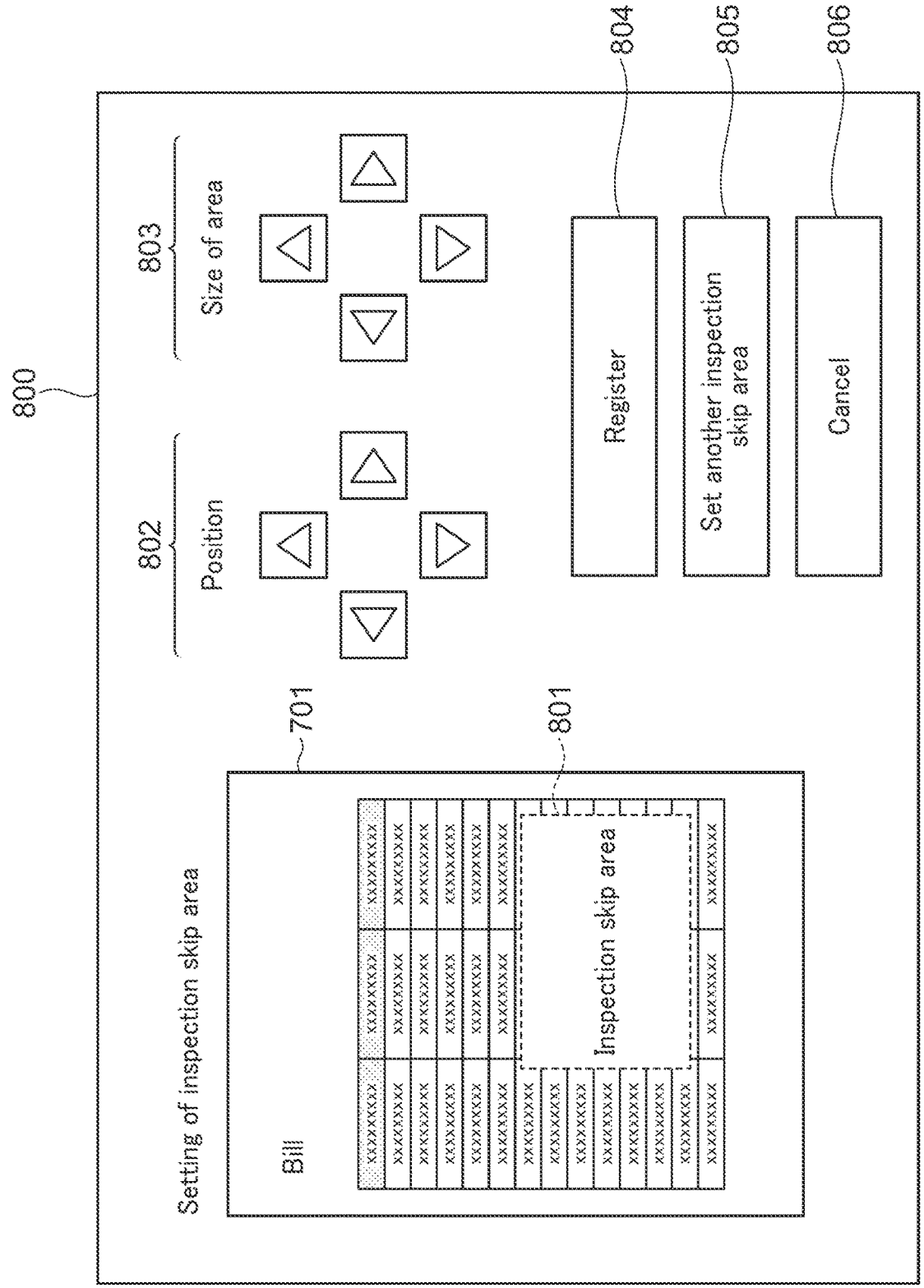
FIG. 8 is a view showing an example of an area setting screen displayed on the display unit of the inspection apparatus.

In the area setting screen 800 shown in FIG. 8, a dashed rectangle within the image display area 701 indicates the inspection skip area 801 to be set. The user can change the position of the inspection skip area 801 with position change buttons 802 and change its size with size change buttons 803. The user who has determined the position and size of the inspection skip area 801 presses a button 804. Thus, the set inspection skip area 801 is registered in association with the correct answer image being displayed on the image display area 701. After completion of registration of the inspection skip area, the registration process screen 700 (FIG. 7) is displayed again.

A button 805 is used for registering another inspection skip area for the same correct answer image after registering a certain inspection skip area. A button 806 is used to cancel setting of the inspection skip area. When the button 806 is pressed, the setting of the inspection skip area is canceled, and the registration process screen 700 (FIG. 7) is displayed again.

The button 705 in the registration process screen 700 (FIG. 7) is used for registering the read image being displayed in the image display area 701 as a correct answer image. When the button 705 is pressed, the image displayed in the image display area 701 is registered as the correct answer image in association with the corresponding sheet number (for example, ⅒th sheet) and the sheet side (front side or back side). After completion of the registration, the registration process screen 700 is changed to the inspection menu screen 400 (FIG. 4). The button 706 is used to cancel the registration of the correct answer image. When the button 706 is pressed, the registration process is stopped and the inspection menu screen 400 (FIG. 4) is displayed again.

Figure 9:
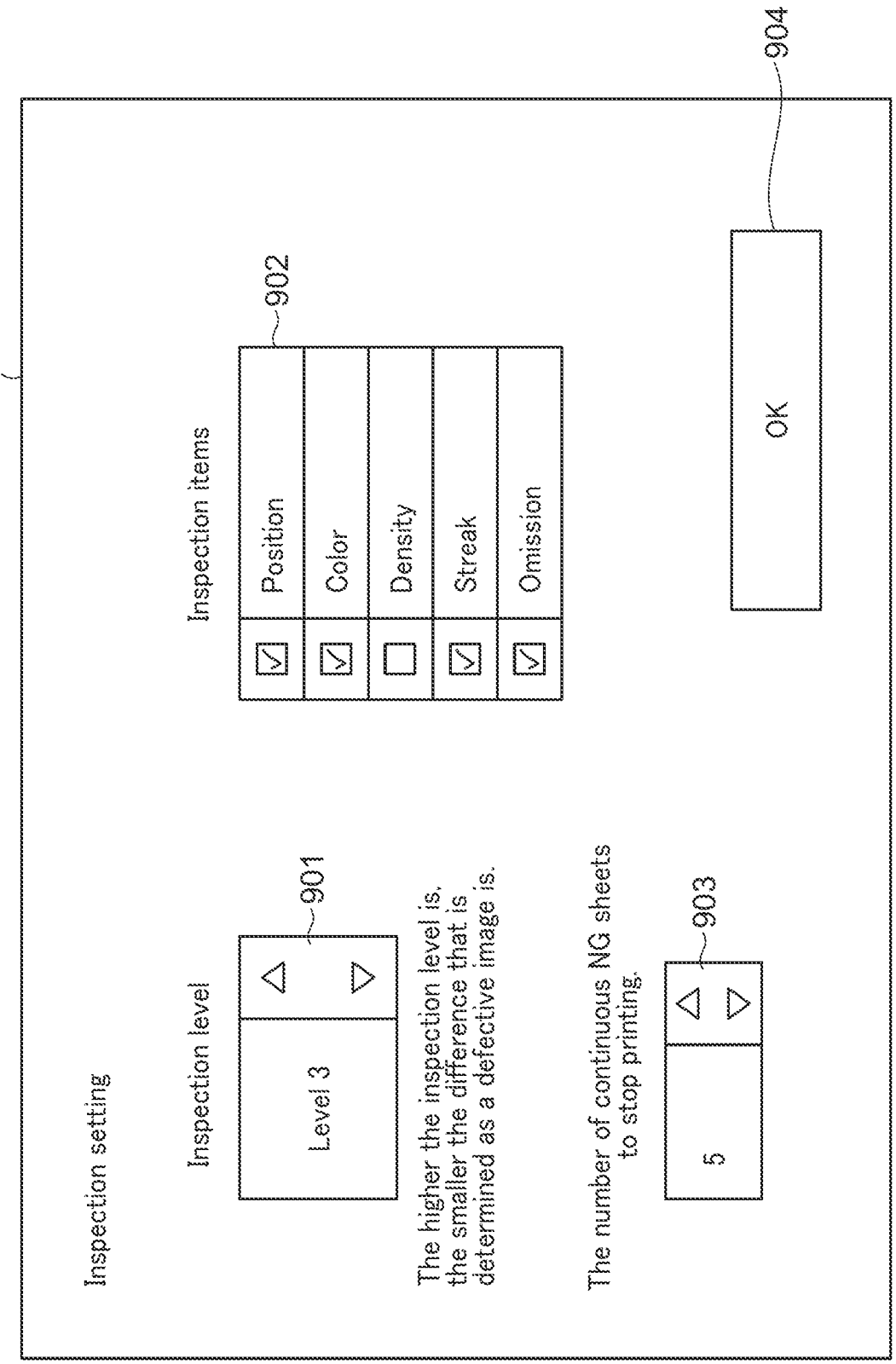
FIG. 9 is a view showing an example of a condition setting screen displayed on the display unit of the inspection apparatus.

When the user presses the button 404 in the inspection menu screen 400 (FIG. 4), the inspection setting is executed. First, a UI screen (hereinafter referred to as a "condition setting screen") for setting the inspection conditions as shown in FIG. 9 is displayed on the display unit 241. The condition setting screen 900 shown in FIG. 9 has three setting areas 901, 902 and 903 and an OK button 904. The setting area 901 is used for setting a defect detection level of the inspection. The user can set a desired inspection level by operating spin buttons in the setting area 901. Here, the higher the set inspection level is (the larger the numerical value is), the smaller the difference between a correct answer image and an inspection image that is determined as a defective image is. The setting area 902 is used for setting the inspection items. The user can select items to be inspected in accordance with the inspection purpose by using a check boxes.

In the example shown in FIG. 9, five items of position, color, density, streak, and omission are prepared. And the four items of position, color, streak, and omission are checked. In this case, although the position, color, streak, and omission are subjected to the inspection, the density is not subjected to the inspection. The setting area 903 is used for setting a threshold of the count of continuous detections of print defect (that is, the count of continuous NG determinations in the inspection process). When the count of continuous NG determinations reaches the threshold, the printing is stopped. Since the subsequent sheet is printed even during the inspection, the count of the continuous NG determinations may exceed the threshold. When the threshold is set to 0, the printing is not stopped even if the NG determination is made. When the OK button 904 is pressed, the inspection condition setting is completed, and the above-described inspection menu screen 400 (FIG. 4) is displayed again.

When the user presses the button 405 in the inspection menu screen 400 (FIG. 4), a UI screen for confirming the inspection result (hereinafter referred to as a "result confirmation screen") as shown in FIG. 10 is displayed on the display unit 241. The result confirmation screen 1000 shown in FIG. 10 includes a result display area 1001 for displaying the details of the inspection result, spin buttons 1002 for switching an inspection job to be displayed, and an OK button 1003.

In FIG. 10, the result display area 1001 displays information about inspection execution date and time, a name of a target inspection job, the number of inspected sheets, the number of passed sheets (OK sheets), and the number of failed sheets (NG sheets) among the number of inspected sheets for the first job among the nine inspection jobs whose histories are stored. The user can switch the inspection job to be displayed by operating the left and right spin buttons 1002. When the user who has confirmed the inspection result presses the OK button 1003, the above-described inspection menu screen 400 (FIG. 4) is displayed again.

Figure 11:
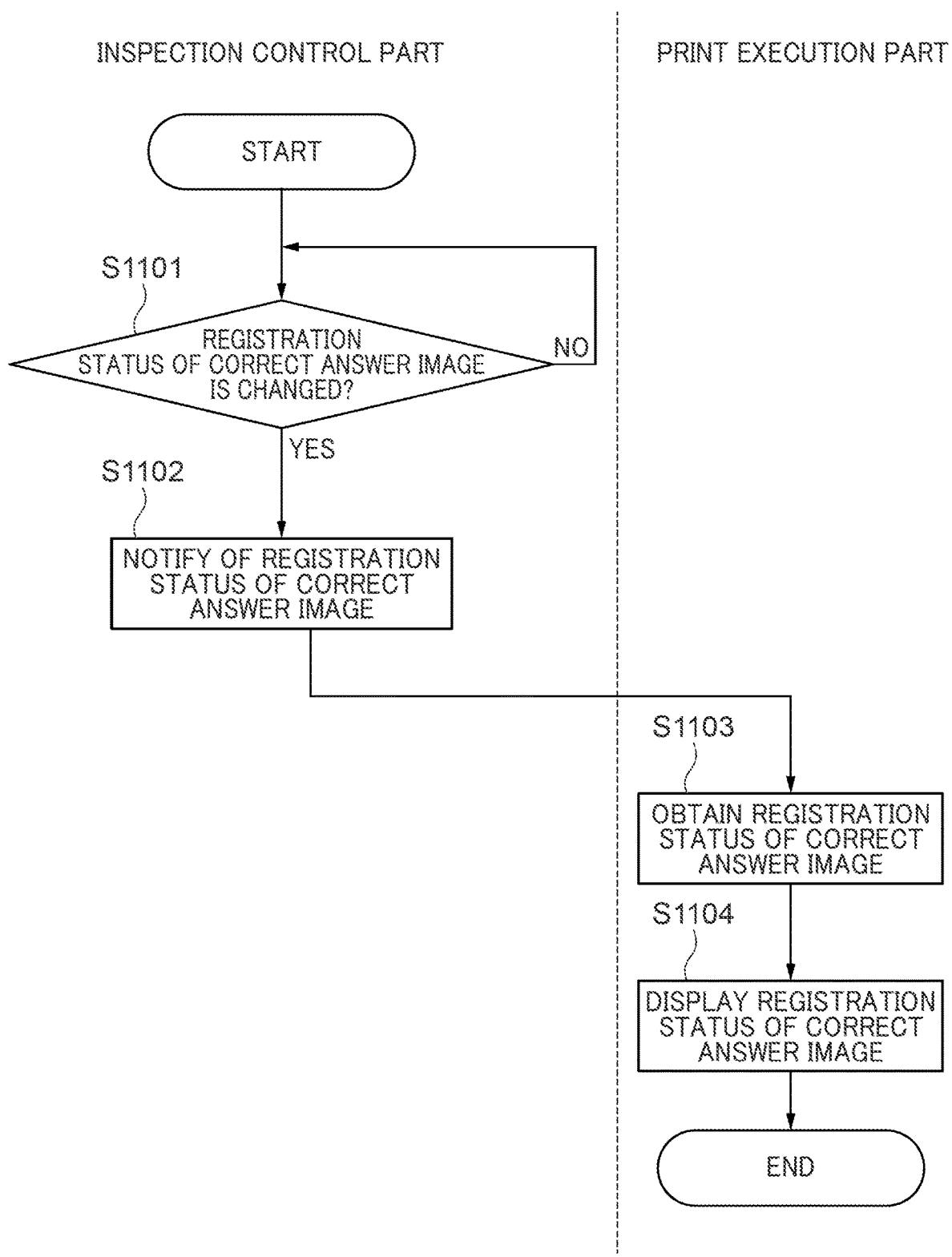
FIG. 11 is a flowchart showing operations of the inspection apparatus, an external controller, and a printer.

FIG. 11 is a flowchart showing the operations of the inspection apparatus 109, external controller 102, and printer 107. In FIG. 11, the inspection apparatus 109 corresponds to an inspection control part, and the external controller 102 and printer 107 correspond to a print execution part (printing means). That is, the flowchart shown in FIG. 11 indicates the processes of the print execution part (the external controller 102 and printer 107) and the inspection control part (the inspection apparatus 109) performed when a correct answer image is registered or inspection setting is executed in the image processing system. This process is started when the image processing system is activated.

Among the processes shown in FIG. 11, the process by the external controller 102 in the print execution part is achieved by the CPU 208 shown in FIG. 2 by developing a program stored in the HDD 210 to the memory 209 and running the program. The process by the printer 107 in the print execution part is achieved by the CPU 222 shown in FIG. 2 by developing a program stored in the HDD 221 to the memory 223 and running the program. The process by the inspection control part is achieved by the CPU 238 shown in FIG. 2 by developing a program stored in the memory 239 to a RAM (not shown) and running the program. In the process by the inspection control part, the CPU 238 serves as a registration means and a notification means in the present invention.

Although this embodiment employs a configuration in which the inspection control part directly notifies the print execution part of a registration status of a correct answer image, the present invention is not limited thereto. For example, the registration status of the correct answer image may be given from the inspection control part through another apparatus like the inserter 108.

In the inspection control part, in a step S1101, the CPU 238 determines whether the registration status of the correct answer image is changed because the user registers the correct answer image or performs the inspection setting. The CPU 238 waits until the registration status of the correct answer image is changed. When determining that the registration status of the correct answer image is changed, the CPU 238 proceeds with the process to a step S1102.

In the step S1102, the CPU 238 notifies the print execution part of the changed content detected in the step S1101 through the communication cable 254. Further, the registration status of the correct answer image may be given from the communication I/F 237 to the communication I/F 260 in the external controller 102 through the communication line 99. A table 1 shows an example of the registration status of the correct answer image (information indicating the registration status) to be given here.

TABLE 1

| Given registration status of the correct answer image | | | |
|---|---|---|---|
| Job ID | Job name | Registration status of correct answer image | Status ID |
| #001 | Specification | Registered | 002 |

The registration status of the correct answer image shown in the table 1 is an example, and any content may be used as long as the job and the registration status of the correct answer image can be determined. For example, the given registration status of the correct answer image includes information about whether the correct answer image has been registered, information about the job name that has instructed registration of the correct answer image, and information about the number of pages of the correct answer image. Also, the registration status of the correct answer image may include registration date and time of the registered correct answer image. In addition, the registration status of the correct answer image may include a condition (inspection condition) for executing the inspection process that inspects the sheet in comparison with the registered correct answer image and information about whether the inspection process has been executed. A display state in receiving the registration status of the correct answer image described in the table 1 will be described by referring to FIG. 12.

In the print execution part, when the registration status of the correct answer image is given, a process in a step S1103 is started. In the step S1103, the CPU 222 of the printer 107 obtains the registration status of the correct answer image given from the inspection control part via the communication I/F 217. The external controller 102 is also notified of the given registration status of the correct answer image from the LAN I/F 218 (FIG. 2) via the internal LAN 105.

In the next step S1104, the CPU 222 displays the registration status of the correct answer image on a registration status screen 1200 shown in FIG. 12, for example, based on the obtained registration status of the correct answer image (the table 1). FIG. 12 is a view showing an example of the registration status screen 1200 displayed in the step S1104 in FIG. 11.

It should be noted that the registration status screen 1200 is displayed on at least one of the display unit 225 of the printer 107 and the display unit 212 of the external controller 102 (display means). For example, the screen 1200 is displayed on both the display units 225 and 212. The registration status screen 1200 may also be displayed on the display unit 241 of the inspection apparatus 109.

The registration status screen 1200 (FIG. 12) includes a title bar 1201 and a detail part 1202. The title bar 1201 displays items representing attributes of contents displayed in the detail part 1202, such as the job name, the registration status of the correct answer image and the number of pages.

In the details portion 1202, the name of the job before transmitting the correct answer image registration job, the name of the job after transmitting the correct answer image registration job, and the name of the job after transmitting the inspection job are displayed as the job names. In addition to the name of each job, the registration status of the correct answer image corresponding to the job and the number of pages are displayed in the detail part 1202. In addition, information corresponding to the given registration status of the correct answer image may be displayed in the detail part 1202. That is, information about the registration date and time of the registered correct answer image, the inspection condition, and information about whether the inspection process has been executed may be displayed. In this way, the display contents of the detail part 1202 are updated based on the contents of the registration status received in the step S1103. The following table 2 shows an example of the relationship between the received registration status of the correct answer image and the displayed status.

TABLE 2

Registration status of correct answer image

| Status ID | Registration status of correct answer image | Displayed status |
|---|---|---|
| 001 | Correct answer image is unregistered | Correct answer image is unregistered |
| 002 | Registration of correct answer image starts | Correct answer image is unregistering |
| 003 | Registration of correct answer image ends | Correct answer image has been registered |
| 004 | Correct answer image has been registered | Correct answer image has been registered |
| 005 | Inspection condition is changed | Inspection condition has been set |
| 006 | Inspection condition is deleted | Inspection condition has been deleted |

The notification of the registration status of the correct answer image in the step S1102 is performed at the following timing. The inspection apparatus 109 can register a plurality of correct answer images. For example, when the registration status of at least one correct answer image changes, the registration statuses of all the correct answer images are given as information indicating the registration status. That is, the CPU 238 always monitors the registration status of the correct answer image after the system is started, and executes the notification process in the step S1102 when there is a change in the registration status of even one correct answer image.

In addition, when the user presses an update button (not shown) displayed on the display unit 212 of the external controller 102, an inquiry may be sent from the print execution part to the inspection control part. That is, upon receiving the inquiry, the inspection control part may determine whether there is a change in the registration status of the correct answer image. And if there is a change, the inspection control part may notify the print execution part of the registration status of the correct answer image. When receiving the inquiry, the inspection control part may notify the print execution part of the current registration status of the correct answer image regardless of whether there is a change in the registration status of the correct answer image.

Figure 13:
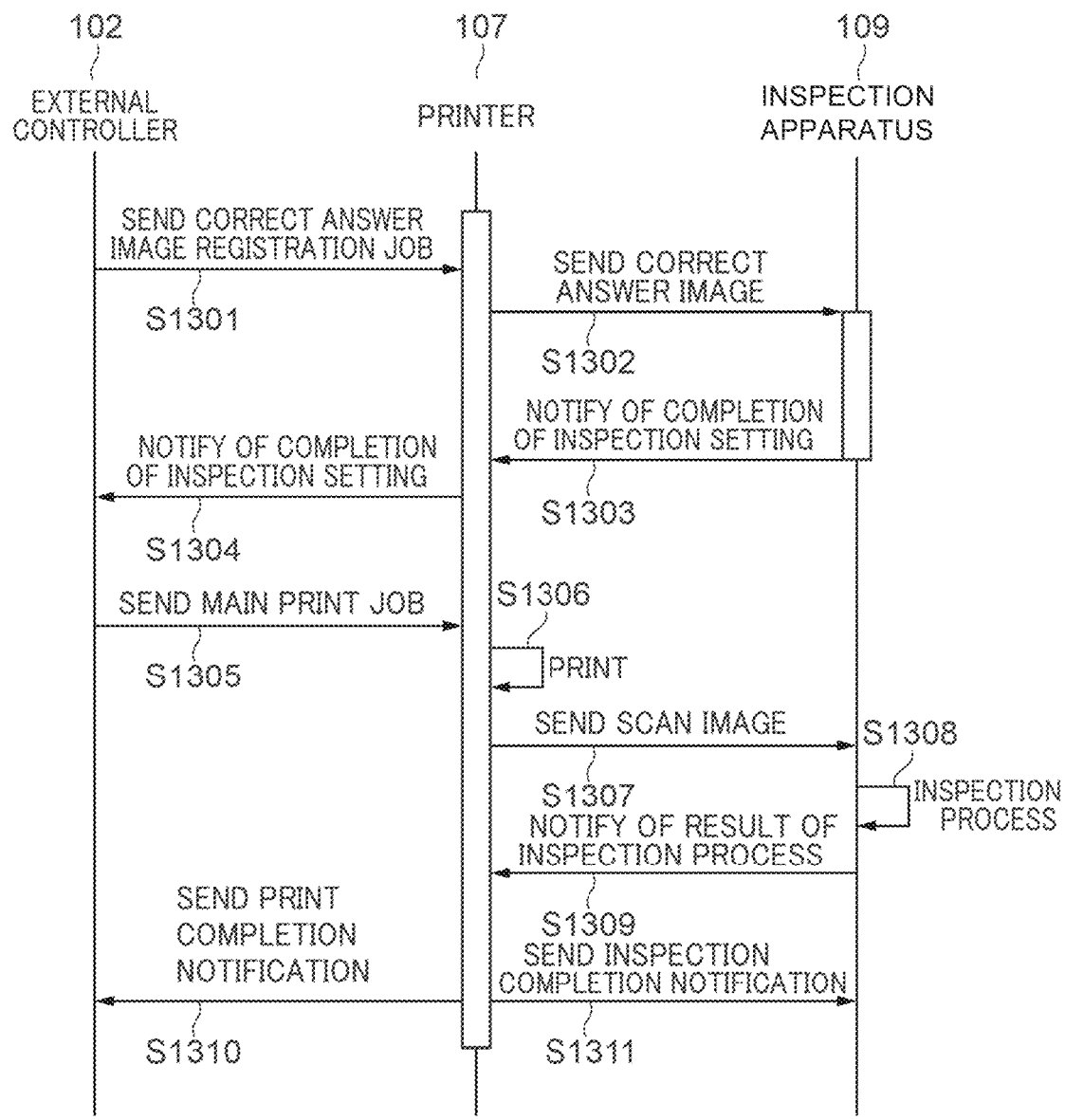
FIG. 13 is a flowchart showing a sequential flow of a correct answer image registration process and an inspection process.

FIG. 13 is a flowchart showing a sequential flow of a correct answer image registration process and the inspection process in the image processing system. FIG. 13 shows registration of the correct answer image and exchange of data between the apparatuses in the inspection process. Execution subjects of the process in the apparatuses are the same as those described in FIG. 11.

In a step S1301, the external controller 102 sends a correct answer image registration job to the printer 107. In a step S1302, the printer 107 that has received the correct answer image registration job from the external controller 102 sends the correct answer image to the inspection apparatus 109. In response to this, the inspection apparatus 109 executes a process of registering the received correct answer image. The inspection apparatus 109 then accepts the inspection setting (FIG. 9) from the user on the displayed correct answer image. When the OK button 904 (FIG. 9) is pressed, the process proceeds to a step S1303.

In the step S1303, the inspection apparatus 109 notifies the printer 107 of completion of the registration of the correct answer image and the inspection setting. In a step S1304, the printer 107, which has received the notification of the completion of the correct answer image registration and the inspection setting from the inspection apparatus 109, notifies the external controller 102 of the completion of the correct answer image registration and the inspection setting. It should be noted that the inspection apparatus 109 may directly notify the external controller 102 of the information.

In a step S1305, the external controller 102, which has received the notification of the completion of the registration of the correct answer image and the inspection setting, sends the main print job to the printer 107. In a step 1306, the printer 107 that has received the main print job from the external controller 102 executes printing in accordance with the received main print job. In a step S1307, the printer 107 sends the scan image obtained by scanning the printed matter to the inspection apparatus 109. In a step S1308, the inspection apparatus 109 executes the inspection process by comparing the registered correct answer image with the scan image. In this inspection process, the CPU 238 of the inspection apparatus 109 serves as the inspection means in the present invention.

In a step S1309, the inspection apparatus 109 notifies the printer 107 of the inspection result (inspection process result). In a step S1310, upon receiving the inspection result from the inspection apparatus 109, the printer 107 sends a print completion notification to the external controller 102. In a step S1311, the printer 107, which has received the inspection result from the inspection apparatus 109, sends an inspection completion notification to the inspection apparatus 109.

It should be noted that the step S1310 and the step S1311 may be executed simultaneously or in parallel, triggered by the notification of the inspection result from the inspection apparatus 109. Alternatively, the step S1310 may be executed after the step S1311.

The example shown in FIG. 13 is configured so that the external controller 102 will send the main print job to the printer 107 upon receipt of the completion notification of the inspection setting. Alternatively, as described in FIG. 14, the correct answer image registration job and the main print job may be transmitted at once from the external controller 102. In such a case, when receiving the completion notification of the inspection setting from the inspection apparatus 109, the printer 107 starts the main print job held thereby.

FIG. 14 is a flowchart showing a sequential flow of a correct answer image registration process and an inspection process of a variation example in the image processing system. Execution subjects of the process in the apparatuses are the same as those described in FIG. 13.

In a step S1401, the external controller 102 sends the check jobs (a correct answer image registration job and an inspection job) to the printer 107. In a step S1402, the printer 107 that has received the check jobs including the correct answer image registration job from the external controller 102 holds the main print job in the inspection job. Further, the printer 107 sends the correct answer image to the inspection apparatus 109. In response to this, the inspection apparatus 109 executes a process of registering the received correct answer image. The inspection apparatus 109 then accepts the inspection setting (FIG. 9) from the user on the displayed correct answer image. When the OK button 904 (FIG. 9) is pressed, the process proceeds to a step S1403.

In the step S1403, the inspection apparatus 109 notifies the printer 107 of completion of the registration of the correct answer image and the inspection setting. In a step S1404, the printer 107, which has received the notification of the completion of the registration of the correct answer image and the inspection setting from the inspection apparatus 109, executes printing according to the held main print job.

In a step S1405, the printer 107 sends the scan image obtained by scanning the printed matter to the inspection apparatus 109. In a step S1406, the inspection apparatus 109 executes the inspection process by comparing the registered correct answer image with the scan image. In a step S1407, the inspection apparatus 109 notifies the printer 107 of the inspection result (inspection process result). In a step S1408, upon receiving the inspection result from the inspection apparatus 109, the printer 107 sends a print completion notification to the external controller 102. In a step S1409, the printer 107, which has received the inspection result from the inspection apparatus 109, sends an inspection completion notification to the inspection apparatus 109.

It should be noted that the step S1408 and the step S1409 may be executed simultaneously or in parallel, triggered by the notification of the inspection result from the inspection apparatus 109. Alternatively, the step S1408 may be executed after the step S1409.

According to this embodiment, when there is a change in the registration status of the correct answer image in the inspection control part (the inspection apparatus 109), the print execution part (the external controller 102 and the printer 107) is notified of the registration status (information indicating the registration status) of the correct answer image. Then, the registration status of the correct answer image is displayed on the registration status screen 1200 of the display unit 225 of the printer 107 and the display unit 212 of the external controller 102 (FIG. 12). Therefore, since an operator can know the registration status of the correct answer image on the print execution part, it is not necessary to confirm the registration status on the inspection apparatus 109. Therefore, it is possible to improve the workability in confirming the registration status of the correct answer image.

The information indicating the registration status includes the information indicating whether the correct answer image has been registered, the number of pages of the correct answer image, the job name that has instructed registration of the correct answer image, the registration date and time, the inspection condition, the information indicating whether the inspection process has been executed, and the like. Therefore, the registration status can be grasped in detail.

In present invention, a printer that is notified of the information indicating the registration status may be the printer 107 or the print execution part (the printer 107 and the external controller 102). When the printer 107 has the function of the external controller 102, the printer 107 may be notified of the information indicating the registration status.

Although the present invention has been described in detail on the basis of the suitable embodiments, the present invention is not limited to these specific embodiments, and various configurations that do not deviate from the scope of the present invention are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-084708, filed May 24, 2022, which is hereby incorporated by reference herein in its entirety.

What is claimed is:

1. An inspection apparatus comprising:
   (i) at least one memory configured to store computer-executable instructions and at least one processor configured to execute the computer-executable instructions stored in the at least one memory, (ii) at least one integrated circuit, or both (i) and (ii) that implement:
   a registration unit configured to register a correct answer image;
   an inspection unit configured to compare an image formed on a sheet by a printing unit with the correct answer image registered by the registration unit to inspect the sheet;
   a determination unit configured to determine whether a change in a registration status of a correct answer image has occurred; and
   a notification unit configured to notify the printing unit of information indicating a registration status of a correct answer image in response to the determination unit determining that a change in a registration status of a correct answer image has occurred.

2. The inspection apparatus according to claim 1, wherein the registration unit is configured to register a plurality of correct answer images, and wherein the notification unit notifies of the registration statuses of all the correct answer images as the information in response to the determination unit determining that a registration status of at least one correct answer image changes.

3. The inspection apparatus according to claim 1, wherein the information indicating a registration status of a correct answer image includes information about whether the correct answer image has been registered.

4. The inspection apparatus according to claim 1, wherein the information indicating a registration status of a correct answer image includes a number of pages of the correct answer image.

5. The inspection apparatus according to claim 1, wherein the information indicating a registration status of a correct answer image includes a job name that instructs registration of the correct answer image.

6. The inspection apparatus according to claim 1, wherein the information indicating a registration status of a correct answer image includes registration date and time of the registered correct answer image.

7. The inspection apparatus according to claim 1, wherein the information indicating a registration status of a correct answer image includes a condition in executing a process of inspecting the sheet in comparison with the registered correct answer image.

8. The inspection apparatus according to claim 1, wherein the information indicating a registration status of a correct answer image includes information indicating whether a process of inspecting the sheet has been executed by comparing the sheet with the registered correct answer image.

9. An image processing system comprising:
   a printer that prints an image on a sheet according to print instruction; and
   an inspection apparatus that is communicably connected to the printer, the inspection apparatus comprising;
   (i) at least one memory configured to store computer-executable instructions and at least one processor configured to execute the computer-executable instructions stored in the at least one memory, (ii) at least one integrated circuit, or both (i) and (ii) that implement:
   a registration unit configured to register a correct answer image;
   an inspection unit configured to compare an image formed on a sheet by the printer with the correct answer image registered by the registration unit to inspect the sheet;
   a determination unit configured to determine whether a change in a registration status of a correct answer image has occurred; and
   a notification unit configured to notify the printer of information indicating a registration status of a correct answer image in response to the determination unit determining that a change in a registration status of a correct answer image has occurred.

10. An image processing system comprising:
    a printer that prints an image on a sheet according to print instruction;
    an inspection apparatus that is communicably connected to the printer; and
    an information processing apparatus that is communicably connected to the printer and the inspection apparatus,
    wherein the information processing apparatus comprises:
    (i) at least one memory configured to store computer-executable instructions and at least one processor configured to execute the computer-executable instructions stored in the at least one memory, (ii) at least one integrated circuit, or both (i) and (ii) that implement:
    a display unit configured to display a screen for accepting a print instruction; and
    a sending unit configured to send the image to the printer,
    wherein the inspection apparatus comprises:
    (i) at least one memory configured to store computer-executable instructions and at least one processor configured to execute the computer-executable instructions stored in the at least one memory, (ii) at least one integrated circuit, or both (i) and (ii) that implement:

a registration unit configured to register a correct answer image;

an inspection unit configured to compare an image formed on a sheet by the printer with the correct answer image registered by the registration unit to inspect the sheet;

a determination unit configured to determine whether a change in a registration status of a correct answer image has occurred; and a notification unit configured to notify the information processing apparatus of information indicating a registration status of the a correct answer image in response to the determination unit determining that a change in a registration status of a correct answer image has occurred, wherein the display unit displays the information indicating the registration status sent from the notification unit.

11. The image processing system according to claim 10, wherein the registration unit is configured to register a plurality of correct answer images; and wherein the notification unit notifies of the registration statuses of all the correct answer images as the information in response to the determination unit determining that a registration status of at least one correct answer image changes.

12. The image processing system according to claim 10, wherein the information indicating a registration status of a correct answer image includes information about whether the correct answer image has been registered.

13. The image processing system according to claim 10, wherein the information indicating a registration status of a correct answer image includes a job name that instructs registration of the correct answer image.

14. The image processing system according to claim 10, wherein the information indicating a registration status of a correct answer image includes registration date and time of the registered correct answer image.

15. The image processing system according to claim 10, wherein the information indicating a registration status of a correct answer image includes information indicating whether a process of inspecting the sheet has been executed by comparing the sheet with the registered correct answer image.

16. A control method for an inspection apparatus, the control method comprising:

comparing an image formed on a sheet by a printer with the registered correct answer image to inspect the sheet;

determining whether a change in a registration status of a correct answer image has occurred; and notifying the printer of information indicating a registration status of a correct answer image in response to a determination that a change in a registration status of a correct answer image has occurred.

17. A non-transitory computer-readable storage medium storing a control program causing a computer to execute a control method for an inspection apparatus, the control method comprising:

registering a correct answer image;

comparing an image formed on a sheet by a printer with the registered correct answer image to inspect the sheet;

determining whether a change in a registration status of a correct answer image has occurred; and notifying the printer of information indicating a registration status of a correct answer image in response to a determination that a change in a registration status of a correct answer image has occurred.

* * * * *